United States Patent  
Boyuk et al.

(10) Patent No.: US 11,898,475 B2
(45) Date of Patent: Feb. 13, 2024

(54) INCREASING AND MEASURING FILTRATION EFFICIENCY OF A HONEYCOMB BODY

(71) Applicant: CORNING INCORPORATED, Corning, NY (US)

(72) Inventors: Pavel Boyuk, Almond, NY (US); Joseph Henry Citriniti, Corning, NY (US); Stefan Wolfgang Kramel, Regensburg (DE); Cai Liu, Suzhou (CN)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/925,677

(22) PCT Filed: Jul. 8, 2020

(86) PCT No.: PCT/CN2020/100782
§ 371 (c)(1),
(2) Date: Nov. 16, 2022

(87) PCT Pub. No.: WO2022/006768
PCT Pub. Date: Jan. 13, 2022

(65) Prior Publication Data
US 2023/0160329 A1 May 25, 2023

(51) Int. Cl.
*F01N 11/00* (2006.01)
*F01N 3/022* (2006.01)

(52) U.S. Cl.
CPC ............ *F01N 11/00* (2013.01); *F01N 3/0222* (2013.01); *F01N 2550/04* (2013.01)

(58) Field of Classification Search
CPC .... F01N 11/00; F01N 3/0222; F01N 2550/04; B01D 46/2418; C04B 38/0012;
(Continued)

(56) References Cited

U.S. PATENT DOCUMENTS 6,864,198 B2 * 3/2005 Merkel ................ C04B 35/632
501/153
9,255,036 B2 2/2016 Drury et al.
(Continued)

FOREIGN PATENT DOCUMENTS

WO 2021/217389 A1 11/2021

OTHER PUBLICATIONS

Liu et al., "Gasoline Particulate Filter Efficiency and Backpressure At Very Low Mileage", SAE Technical Paper, 2018, pp. 1-9.
(Continued)

*Primary Examiner* — Jesse S Bogue
(74) *Attorney, Agent, or Firm* — Joseph M. Homa

(57) ABSTRACT

Apparatus and methods are disclosed which apply inorganic particles to a plugged honeycomb body comprising porous walls, an inlet end and an outlet end. The apparatus comprises a particle counter and the method comprises counting a selected portion of the inorganic particles from a first sampling port upstream from the plugged honeycomb body and a second sampling port downstream from the plugged honeycomb body. The selected portion of the inorganic particles are in a preselected inorganic particle size range. Filtration efficiency can be determined while inorganic particles are being deposited, for example to increase filtration efficiency.

20 Claims, 9 Drawing Sheets

(58) Field of Classification Search
CPC ... B05B 7/0075; B05B 7/1454; B05B 12/084; B05B 13/06; Y02T 10/12; Y02T 10/40
See application file for complete search history.

(56) References Cited

U.S. PATENT DOCUMENTS

| | | | |
|---|---|---|---|
| 9,745,227 B2* | 8/2017 | Cai | C04B 41/4545 |
| 11,117,124 B2* | 9/2021 | Beall | C04B 38/0009 |
| 2014/0272276 A1* | 9/2014 | Drury | C04B 35/6365 |
| | | | 428/116 |
| 2019/0048771 A1 | 2/2019 | Liu et al. | |
| 2021/0179501 A1 | 6/2021 | Lewis et al. | |
| 2021/0197105 A1* | 7/2021 | Gu | C04B 26/10 |
| 2021/0347702 A1 | 11/2021 | Citriniti et al. | |
| 2021/0354071 A1 | 11/2021 | Addiego et al. | |
| 2022/0325644 A1 | 10/2022 | Tandon | |
| 2023/0213433 A1* | 7/2023 | Citriniti | G01N 15/0826 |
| | | | 356/338 |

OTHER PUBLICATIONS

Liu et al., "Using Artificial Ash To Improve GPF Performance At Zero Mileage", SAE Technical Paper, 2018, pp. 1-7.

* cited by examiner

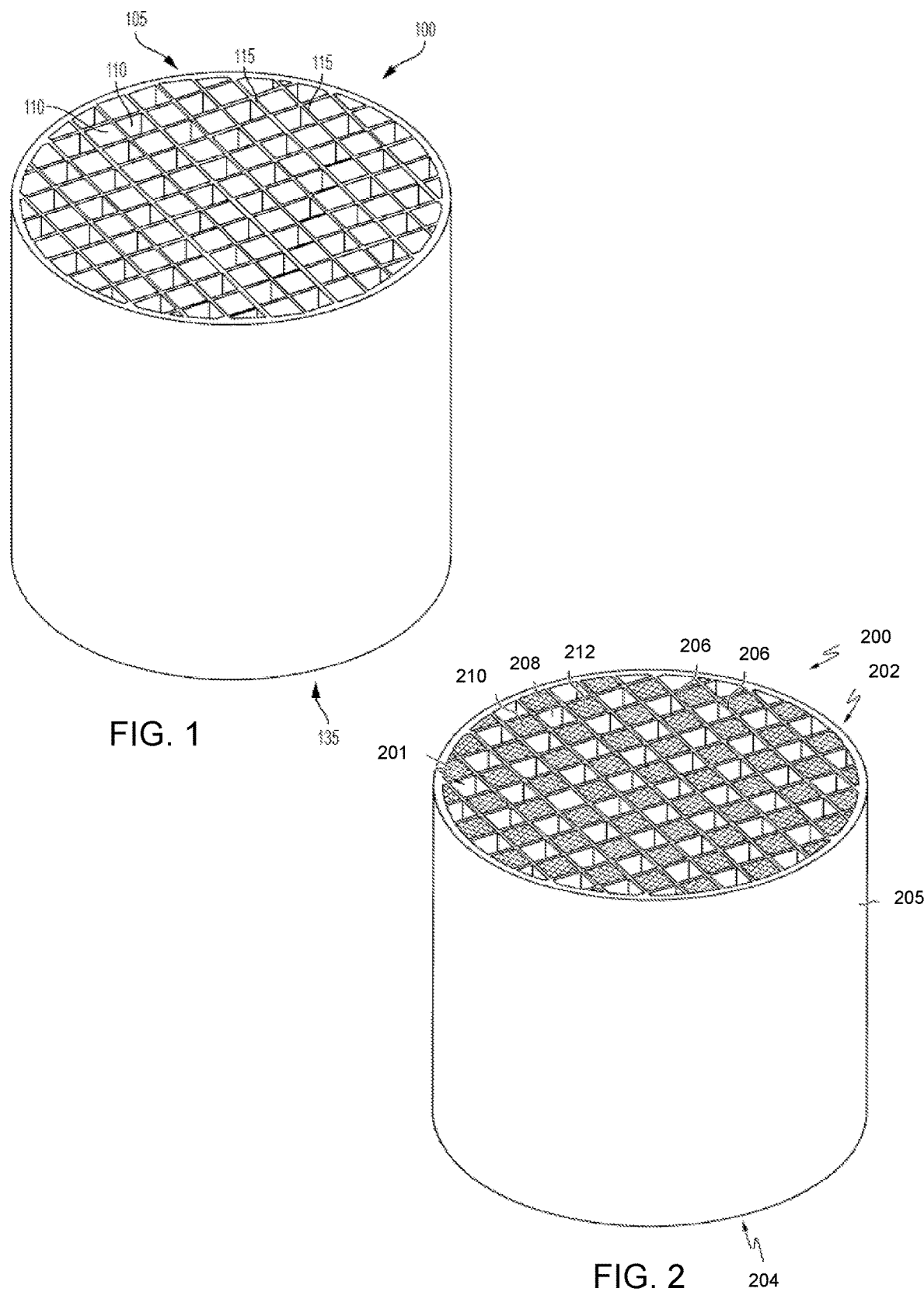

INCREASING AND MEASURING FILTRATION EFFICIENCY OF A HONEYCOMB BODY

CROSS-REFERENCE TO RELATED APPLICATIONS

This application claims the benefit of priority under 35 U.S.C. § 365 of International Patent Application Serial No. PCT/CN2020/100782 filed on Jul. 8, 2020, the content of which is relied upon and incorporated herein by reference in its entirety.

TECHNICAL FIELD

Embodiments of the present disclosure generally relate to methods and apparatus for increasing, and inline measurement of, filtration efficiency of honeycomb bodies.

BACKGROUND

Particulate filters, for example, diesel particulate filters and gasoline particulate filters (GPFs), filter particulates from the exhaust stream from engines such as automotive vehicles burning diesel and gasoline fuel, respectively.

Currently the process of depositing inorganic particles on the walls of the plugged honeycomb body is controlled by running several test pieces before a production lot is produced to determine a target spray time (or total of the sprayed suspension weight) for the process to hit the desired FE target. Once this target has been determined, all parts proceed in the deposition process with the same process set points. Once the part has reached the target time (or weight), the part is removed and tested to measure the final actual FE value. If the part has been over-coated with inorganic particles, the FE value will be above the upper limit it will be rejected and if a part is undercoated, it may or may not be re-run to try and reach the target FE. The feedback for the deposition process is therefore, a semi-closed loop process.

SUMMARY

One or more embodiments of the disclosure are directed to an apparatus configured to apply inorganic particles to a plugged honeycomb body comprising porous walls, an inlet end and an outlet end, the apparatus comprising: a duct spanning from a first end to a second end; a deposition zone configured to house the plugged honeycomb body in fluid communication with the second end of the duct; an inlet in fluid communication with the duct, the inlet upstream from the deposition zone; an inorganic particle source in fluid communication with the inlet configured to deliver the inorganic particles to the inlet and to the deposition zone; a flow generator in fluid communication with the duct and the deposition zone configured to establish a flow of a fluid and the inorganic particles introduced into the duct; a first sampling port upstream from and in fluid communication with the deposition zone; a second sampling port downstream from and in fluid communication with the deposition zone; and a particle counter in fluid communication with the first sampling port and the second sampling port configured to count a selected portion of the inorganic particles in a preselected inorganic particle size range.

Other embodiments of the present disclosure are directed to apparatus configured to apply inorganic particles to a plugged honeycomb body comprising porous walls, an inlet end and an outlet end, the apparatus comprising: a duct spanning from a first end to a second end; a deposition zone configured to house the plugged honeycomb body in fluid communication with the second end of the duct; an inlet in fluid communication with the duct, the inlet upstream from the deposition zone; and an inorganic particle source, a liquid source and a binder in fluid communication with the inlet and configured to deliver a mixture of the inorganic particles, the liquid and the binder to an atomizing nozzle and to the deposition zone; a flow generator in fluid communication with the duct and the deposition zone configured to establish a flow of fluid and the inorganic particles introduced into the duct; a first sampling port upstream from and in fluid communication with the deposition zone; a second sampling port downstream from and in fluid communication with the deposition zone; a particle counter in fluid communication with the first sampling port and the second sampling port configured to count a selected portion of the inorganic particles in a preselected inorganic particle size range upstream from the deposition zone and downstream from the deposition zone; and a processor configured to calculate a percentage of inorganic particles trapped by the plugged honeycomb body based according to a formula $(n_u - n_d)/n_u$, wherein $n_u$=number of inorganic particles upstream from the deposition zone and $n_d$=number of particles downstream from the deposition zone.

Additional embodiments of the disclosure are directed to a method of applying inorganic particles to a plugged honeycomb body comprising porous walls, an inlet end and an outlet end, the method comprising: flowing the inorganic particles from a first end of a duct to a second end of the duct to a plugged honeycomb body; sampling a portion of the inorganic particles from a first sampling port upstream from and in fluid communication with the plugged honeycomb body and from a second sampling port downstream from and in fluid communication with the plugged honeycomb body; and counting a selected portion of the inorganic particles from the first sampling port and the second sampling port, the selected portion of the inorganic particles in a preselected inorganic particle size range.

Additional embodiments of the disclosure are directed to a method of increasing a filtration efficiency of a porous honeycomb filter comprised of a plugged honeycomb body comprising porous walls, an inlet end and an outlet end, the method comprising: flowing an inlet flow of inorganic particles into the inlet end of the plugged honeycomb body; counting an inlet number of a selected portion of the inorganic particles entering the plugged honeycomb body; counting an exit number of a selected portion of the inorganic particles exiting the plugged honeycomb body in an outlet flow; wherein inorganic particles which enter the plugged honeycomb body without exiting the plugged honeycomb body are deposited onto and/or into the porous walls of the honeycomb body, thereby increasing a filtration efficiency of the plugged honeycomb body as deposition continues; determining a filtration efficiency of the plugged honeycomb body with the deposited particles based on the inlet number and the outlet number; and terminating the flowing of the inlet flow of inorganic particles into the inlet end of the plugged honeycomb body based on the determined filtration efficiency.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 schematically depicts a honeycomb body;

FIG. 2 schematically depicts a wall-flow particulate filter according to embodiments disclosed and described herein;

Figure 3:
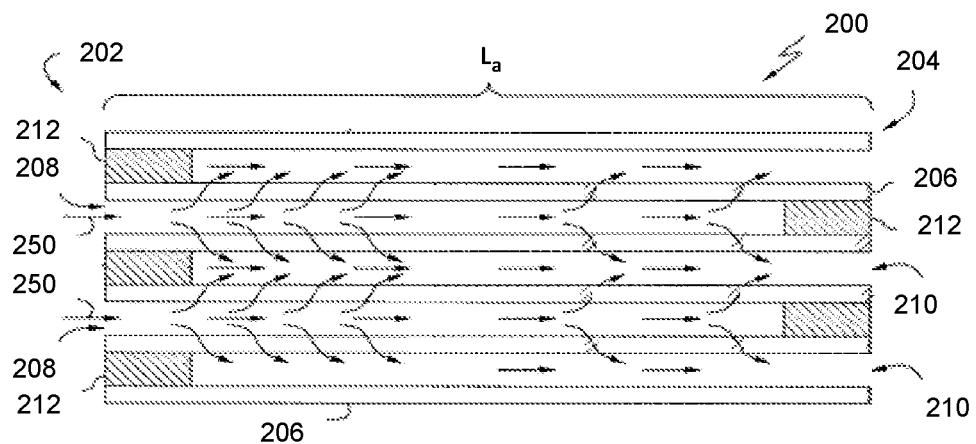
FIG. 3 is a cross-sectional longitudinal view of the particulate filter shown in FIG. 8.

FIG. 9 is a graph showing a particle concentration of an aerosol process upstream and downstream of a plugged honeycomb body during deposition;

FIG. 10 is a graphical depiction of inline filtration efficiency measurements taken during an aerosol deposition process on plugged honeycomb body; and FIG. 11 is a graph showing a correlation of a final inline filtration efficiency measurement to an offline smoke filtration efficiency measurement.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

In one set of embodiments, an apparatus disclosed herein is configured to apply inorganic particles to a plugged honeycomb body comprising porous walls, an inlet end and an outlet end, the apparatus comprising: a duct spanning from a first end to a second end; a deposition zone configured to house the plugged honeycomb body in fluid communication with the second end of the duct; an inlet in fluid communication with the duct, the inlet upstream from the deposition zone; an inorganic particle source in fluid communication with the inlet configured to deliver the inorganic particles to the inlet and to the deposition zone; a flow generator in fluid communication with the duct and the deposition zone configured to establish a flow of a fluid and the inorganic particles introduced into the duct; a first sampling port upstream from and in fluid communication with the deposition zone; a second sampling port downstream from and in fluid communication with the deposition zone; and a particle counter in fluid communication with the first sampling port and the second sampling port configured to count a selected portion of the inorganic particles in a preselected inorganic particle size range.

In some embodiments, the particle counter is configured to count the inorganic particles upstream from the deposition zone and downstream from the deposition zone.

1. The apparatus of claim 2, wherein the preselected inorganic particle size range is in a range of from 0.1 μm to 10 μm.

2. The apparatus of claim 2, wherein the preselected inorganic particle size range is in a range of from 0.1 μm to 1 μm.

3. The apparatus of claim 2, wherein the preselected inorganic particle size range is in a range of from 0.1 μm to 0.5 μm.

4. The apparatus of claim 2, wherein the preselected inorganic particle size range is in a range of from 0.3 μm to 0.5 μm.

5. The apparatus of claim 2, wherein the particle counter comprises an optical spectrometer.

6. The apparatus of claim 2, wherein the particle counter comprises an engine exhaust particle sizer spectrometer.

7. The apparatus of claim 2, wherein the particle counter comprises a scanning mobility particle sizer.

8. The apparatus of claim 2, wherein the particle counter comprises a condensation particle counter.

9. The apparatus of claim 2, further comprising an inorganic particle concentration dilution device upstream from the particle counter and downstream from the first sampling port, the inorganic particle concentration dilution device configured to reduce a concentration of inorganic particles at the first sampling port prior to flowing to the particle counter.

10. The apparatus of claim 11, wherein the inorganic particle concentration dilution device comprises a dilution chamber configured to provide a gas to particle ratio in a range of 20:1 to 100:1 in the dilution chamber.

11. The apparatus of claim 12, wherein the dilution chamber is configured to provide a gas to particle ratio in a range of 70:1 to 100:1 in the dilution chamber.

12. That apparatus of claim 13, wherein the dilution device comprises a flow splitting connection providing a gas to particle ratio in a range of 20:1 to 100:1 in the dilution chamber.

13. The apparatus of claim 13, wherein the dilution device comprises a flow splitting connection providing a gas to particle ratio in a range of 70:1 to 100:1 in the dilution chamber.

In some embodiments, the apparatus further comprises a processor configured to calculate a percentage of inorganic particles trapped by the plugged honeycomb body based according to a formula $(n_u-n_d)/n_u$, wherein $n_u$=number of inorganic particles upstream from the deposition zone and $n_d$=number of particles downstream from the deposition zone.

14. The apparatus of claim 1, wherein the inorganic particle source is in fluid communication with an atomizing nozzle.

15. The apparatus of claim 17, wherein the fluid is a gas, and the atomizing nozzle is in fluid communication with a liquid source and a binder, and wherein the binder, the liquid and the inorganic particle source are configured to be flowed through the atomizing nozzle to form an aerosol.

In some embodiments, the flow generator comprises a fan.

In another set of embodiments, an apparatus is disclosed herein which is configured to apply inorganic particles to a plugged honeycomb body comprising porous walls, an inlet end and an outlet end, the apparatus comprising: a duct spanning from a first end to a second end; a deposition zone configured to house the plugged honeycomb body in fluid communication with the second end of the duct; an inlet in fluid communication with the duct, the inlet upstream from the deposition zone; and an inorganic particle source, a liquid source and a binder in fluid communication with the inlet and configured to deliver a mixture of the inorganic particles, the liquid and the binder to an atomizing nozzle and to the deposition zone; a flow generator in fluid communication with the duct and the deposition zone configured to establish a flow of fluid and the inorganic particles introduced into the duct; a first sampling port upstream from and in fluid communication with the deposition zone; a second sampling port downstream from and in fluid communication with the deposition zone; a particle counter in fluid communication with the first sampling port and the second sampling port configured to count a selected portion of the inorganic particles in a preselected inorganic particle size range upstream from the deposition zone and downstream from the deposition zone; and a processor configured to calculate a percentage of inorganic particles trapped by the plugged honeycomb body based according to a formula $(n_u-n_d)/n_u$, wherein $n_u$=number of inorganic particles upstream from the deposition zone and $n_d$=number of particles downstream from the deposition zone.

In another set of embodiments disclosed herein is a method of applying inorganic particles to a plugged honeycomb body comprising porous walls, an inlet end and an outlet end, the method comprising: flowing the inorganic particles from a first end of a duct to a second end of the duct to a plugged honeycomb body; sampling a portion of the inorganic particles from a first sampling port upstream from and in fluid communication with the plugged honeycomb body and from a second sampling port downstream from and in fluid communication with the plugged honeycomb body; and counting a selected portion of the inorganic particles from the first sampling port and the second sampling port, the selected portion of the inorganic particles in a preselected inorganic particle size range.

In some embodiments, the counting is performed with a particle counter.

In some embodiments, a flow generator in fluid communication with the duct and the plugged honeycomb body is used to generate a flow of inorganic particles configured to establish a flow of a fluid and the inorganic particles.

In some embodiments, the fluid comprises a gas and the flow generator comprises a fan.

In some embodiments, the preselected inorganic particle size range is in a range of from 0.1 μm to 10 μm.

In some embodiments, the preselected inorganic particle size range is in a range of from 0.1 μm to 1 μm. In some embodiments, the preselected inorganic particle size range is in a range of from 0.1 μm to 0.5 μm. In some embodiments, the preselected inorganic particle size range is in a range of from 0.3 μm to 0.5 μm. In some embodiments, the particle counter comprises an optical spectrometer. In some embodiments, the particle counter comprises an engine exhaust particle sizer spectrometer. In some embodiments, the particle counter comprises a scanning mobility particle sizer. In some embodiments, the particle counter comprises a condensation particle counter.

In some embodiments, the method further comprises diluting the flow of particles upstream from the particle counter and downstream from the first sampling port to reduce a concentration of inorganic particles at the first sampling port prior to flowing to the particle counter. In some embodiments, diluting the flow of particles is performed in a dilution chamber configured to provide a gas to particle ratio in a range of 20:1 to 100:1 in the dilution chamber. In some embodiments, the dilution chamber is configured to provide a gas to particle ratio in a range of 70:1 to 100:1 in the dilution chamber. In some embodiments, diluting the flow of particles comprises splitting the flow of particles to provide a gas to particle ratio in a range of 20:1 to 100:1 in the dilution chamber. In some embodiments, diluting the flow of particles comprises splitting the flow of particles to provide a gas to particle ratio in a range of 70:1 to 100:1 in the dilution chamber.

In some embodiments, the method further comprises calculating a percentage of inorganic particles trapped by the plugged honeycomb body based according to a formula $(n_u-n_d)/n_u$, wherein $n_u$=number of inorganic particles upstream from honeycomb body and $n_d$=number of particles downstream from the plugged honeycomb body.

In some embodiments, the inorganic particles are flowed through an atomizing nozzle.

In some embodiments, the fluid is a gas, and the inorganic particles and a liquid and a binder are flowed through the atomizing nozzle to form an aerosol.

In another set of embodiments, a method is disclosed herein of increasing a filtration efficiency of a porous honeycomb filter comprised of a plugged honeycomb body comprising porous walls, an inlet end and an outlet end, the method comprising: flowing an inlet flow of inorganic particles into the inlet end of the plugged honeycomb body; counting an inlet number of a selected portion of the inorganic particles entering the plugged honeycomb body; counting an exit number of a selected portion of the inorganic particles exiting the plugged honeycomb body in an outlet flow; wherein inorganic particles which enter the plugged honeycomb body without exiting the plugged honeycomb body are deposited onto and/or into the porous walls of the honeycomb body, thereby increasing a filtration efficiency of the plugged honeycomb body as deposition continues; determining a filtration efficiency of the plugged honeycomb body with the deposited particles based on the inlet number and the outlet number; and terminating the flowing of the inlet flow of inorganic particles into the inlet end of the plugged honeycomb body based on the determined filtration efficiency.

In some embodiments, the selected portion for the counting of the inlet number is in a preselected inorganic particle size range; in some embodiments, the selected portion for the counting of the outlet number is in a preselected inorganic particle size range.

In some embodiments, the preselected inorganic particle size range is the same for the selected portions for the counting of the inlet number and the outlet number; in some of these embodiments, the preselected inorganic particle size range is in a range of from 0.1 μm to 10 μm; in some embodiments, the preselected inorganic particle size range is in a range of from 0.1 μm to 1 μm; in some embodiments, the preselected inorganic particle size range is in a range of from 0.1 μm to 0.5 μm; in some embodiments, the preselected inorganic particle size range is in a range of from 0.3 μm to 0.5 μm.

In some embodiments, the inlet flow further comprises a fluid; in some of these embodiments, the fluid is a gas.

In some embodiments, the counting is performed with a particle counter; in some of these embodiments, the particle counter comprises an optical spectrometer; in some of these embodiments, wherein the particle counter comprises an engine exhaust particle sizer spectrometer; in some of these embodiments, the particle counter comprises a scanning mobility particle sizer; in some of these embodiments, the particle counter comprises a condensation particle counter.

In some embodiments, the inlet flow comprises aerosolized particles.

In some embodiments, the inlet number is obtained from a diluted portion of the inlet flow which is directed into a particle counter; in some of these embodiments, the diluted portion has a gas to particle ratio in a range of 20:1 to 100:1; in some of these embodiments, the diluted portion has a gas to particle ratio in a range of 70:1 to 100:1; in some of these embodiments, the outlet number is obtained from a diluted portion of the outlet flow which is directed into a particle counter.

In some of the above embodiments, the terminating further comprises terminating the flowing of the inlet flow of inorganic particles into the inlet end of the plugged honeycomb body after the filtration efficiency has reached a target filtration efficiency.

In some of the above embodiments, the terminating further comprises terminating the flowing of the inlet flow of inorganic particles into the inlet end of the plugged honeycomb body after the filtration efficiency has failed to reach a target filtration efficiency within a target deposition time.

In some of the above embodiments, wherein the terminating further comprises terminating the flowing of the inlet flow of inorganic particles into the inlet end of the plugged honeycomb body if the exit number exceeds a maximum exit number.

In some of the above embodiments, the terminating further comprises terminating the flowing of the inlet flow of inorganic particles into the inlet end of the plugged honeycomb body if the exit number exceeds a maximum exit number within a target deposition time.

In some of the above embodiments, the plugged honeycomb body comprises inorganic particles deposited in and/or on the porous walls prior to initiation of the flowing of the inlet flow of inorganic particles into the inlet end of the plugged honeycomb body, wherein the flowing of the inlet flow increases the amount of inorganic particles trapped by the plugged honeycomb body.

In some of the above embodiments, the plugged honeycomb body is free of inorganic particles deposited in and/or on the porous walls prior to initiation of the flowing of the inlet flow of inorganic particles into the inlet end of the plugged honeycomb body, wherein the flowing of the inlet flow introduces the inorganic particles to the plugged honeycomb body.

In some of the above embodiments, the determining the filtration efficiency ($\mu_c$) comprises calculating the ratio: (inlet number−outlet number)/(inlet number).

Apparatus and methods of the present disclosure relate to application of inorganic particles to a plugged honeycomb body comprising porous walls. With reference now to FIG. 1, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105, which may be an inlet end, and second end 135, which may be an outlet end, of the plugged honeycomb body. The honeycomb body may have one or more of the channels plugged on one, or both of the first end 105 and the second end 135. The pattern of plugged channels of the honeycomb body is not limited. In some embodiments, a pattern of plugged and unplugged channels at one end of the plugged honeycomb body may be, for example, a checkerboard pattern where alternating channels of one end of the plugged honeycomb body are plugged. In some embodiments, plugged channels at one end of the plugged honeycomb body have corresponding unplugged channels at the other end, and unplugged channels at one end of the plugged honeycomb body have corresponding plugged channels at the other end.

In one or more embodiments, the plugged honeycomb body may be comprised of cordierite, aluminum titanate, enstatite, mullite, forsterite, corundum (SiC), spinel, sapphirine, or periclase, or combinations thereof. In general, cordierite has a composition according to the formula $Mg_2Al_4Si_5O_{18}$. In some embodiments, the pore size of the ceramic material, the porosity of the ceramic material, and the pore size distribution of the ceramic material are obtained in a controlled manner, for example by varying the particle sizes of the ceramic raw materials. In addition, pore formers can be included in ceramic batches used to form the plugged honeycomb body.

In some embodiments, walls of the plugged honeycomb body may have an average thickness from greater than or equal to 25 µm to less than or equal to 250 µm, such as from greater than or equal to 45 µm to less than or equal to 230 µm, greater than or equal to 65 µm to less than or equal to 210 µm, greater than or equal to 65 µm to less than or equal to 190 µm, or greater than or equal to 85 µm to less than or equal to 170 µm. The walls of the plugged honeycomb body can be described to have a base portion comprised of a bulk portion (also referred to herein as the bulk), and surface portions (also referred to herein as the surface). The surface portion of the walls extends from a surface of a wall of the plugged honeycomb body into the wall toward the bulk portion of the plugged honeycomb body. The surface portion may extend from 0 (zero) to a depth of about 10 µm into the base portion of the wall of the plugged honeycomb body. In some embodiments, the surface portion may extend about 5 µm, about 7 µm, or about 9 µm (i.e., a depth of 0 (zero)) into the base portion of the wall. The bulk portion of the plugged honeycomb body constitutes the thickness of wall minus the surface portions. Thus, the bulk portion of the plugged honeycomb body may be determined by the following equation:

$$t_{total} - 2t_{surface}$$

where $t_{total}$ is the total thickness of the wall and $t_{surface}$ is the thickness of the wall surface.

In one or more embodiments, the bulk of the plugged honeycomb body (prior to applying any filtration material) has a bulk median pore size from greater than or equal to 7 µm to less than or equal to 25 µm, such as from greater than or equal to 12 µm to less than or equal to 22 µm, or from greater than or equal to 12 µm to less than or equal to 18 µm. For example, in some embodiments, the bulk of the plugged honeycomb body may have bulk median pore sizes of about 10 µm, about 11 µm, about 12 µm, about 13 µm, about 14 µm, about 15 µm, about 16 µm, about 17 µm, about 18 µm, about 19 µm, or about 20 µm. Generally, pore sizes of any given material exist in a statistical distribution. Thus, the term "median pore size" or "d50" (prior to applying any filtration material) refers to a length measurement, above which the pore sizes of 50% of the pores lie and below which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In specific embodiments, the median pore size (d50) of the bulk of the plugged honeycomb body (prior to applying any filtration material) is in a range of from 10 µm to about 16 µm, for example 13-14 µm, and the d10 refers to a length measurement, above which the pore sizes of 90% of the pores lie and below which the pore sizes of the remaining 10% of the pores lie, based on the statistical distribution of all the pores is about 7 µm. In specific embodiments, the d90 refers to a length measurement, above which the pore sizes of 10% of the pores of the bulk of the plugged honeycomb body (prior to applying any filtration material) lie and below which the pore sizes of the remaining 90% of the pores lie, based on the statistical distribution of all the pores is about 30 µm. In specific embodiments, the median diameter (D50) of the secondary particles or agglomerates is about 2 microns. In specific embodiments, it has been determined that when the agglomerate median size D50 and the median wall pore size of the bulk honeycomb body d50 is such that there is a ratio of agglomerate median size D50 to median wall pore size of the bulk honeycomb body d50 is in a range of from 5:1 to 16:1, excellent filtration efficiency results and low pressure drop results are achieved. In more specific embodiments, a ratio of agglomerate median size D50 to median wall pore size of the bulk of honeycomb body d50 (prior to applying any filtration material) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In some embodiments, the bulk of the plugged honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography, these two methods in particular are valuable for measuring surface porosity and bulk porosity independent from one another. In one or more embodiments, the bulk porosity of the plugged honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In one or more embodiments, the surface portion of the plugged honeycomb body has a surface median pore size from greater than or equal to 7 µm to less than or equal to 20 µm, such as from greater than or equal to 8 µm to less than or equal to 15 µm, or from greater than or equal to 10 µm to less than or equal to 14 µm. For example, in some embodiments, the surface of the plugged honeycomb body may have surface median pore sizes of about 8 µm, about 9 µm, about 10 µm, about 11 µm, about 12 µm, about 13 µm, about 14 µm, or about 15 µm.

In some embodiments, the surface of the plugged honeycomb body may have surface porosities, prior to application of a filtration material deposit, of from greater than or equal to 35% to less than or equal to 75% as measured by mercury intrusion porosimetry, SEM, or X-ray tomography. In one or more embodiments, the surface porosity of the plugged honeycomb body may be less than 65%, such as less than 60%, less than 55%, less than 50%, less than 48%, less than 46%, less than 44%, less than 42%, less than 40%, less than 48%, or less than 36% for example.

Referring now to FIGS. 2 and 3, a honeycomb body in the form of a particulate filter 200 is schematically depicted. The particulate filter 200 may be used as a wall-flow filter to filter particulate matter from an exhaust gas stream 250, such as an exhaust gas stream emitted from a gasoline engine, in which case the particulate filter 200 is a gasoline particulate filter. The particulate filter 200 generally comprises a honeycomb body having a plurality of channels 201 or cells which extend between an inlet end 202 and an outlet end 204, defining an overall length La (shown in FIG. 3). The channels 201 of the particulate filter 200 are formed by, and at least partially defined by a plurality of intersecting channel walls 206 that extend from the inlet end 202 to the outlet end 204. The particulate filter 200 may also include a skin layer 205 surrounding the plurality of channels 201. This skin layer 205 may be extruded during the formation of the channel walls 206 or formed in later processing as an after-applied skin layer, such as by applying a skinning cement to the outer peripheral portion of the channels.

An axial cross section of the particulate filter 200 of FIG. 2 is shown in FIG. 3. In some embodiments, certain channels are designated as inlet channels 208 and certain other channels are designated as outlet channels 210. In some embodiments of the particulate filter 200, at least a first set of channels may be plugged with plugs 212. Generally, the plugs 212 are arranged proximate the ends (i.e., the inlet end or the outlet end) of the channels 201. The plugs are generally arranged in a pre-defined pattern, such as in the checkerboard pattern shown in FIG. 2, with every other channel being plugged at an end. The inlet channels 208 may be plugged at or near the outlet end 204, and the outlet channels 210 may be plugged at or near the inlet end 202 on channels not corresponding to the inlet channels, as depicted in FIG. 3. Accordingly, each cell may be plugged at or near one end of the particulate filter only.

While FIG. 2 generally depicts a checkerboard plugging pattern, it should be understood that alternative plugging patterns may be used in the porous ceramic honeycomb article. In the embodiments described herein, the particulate filter 200 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 206 of the particulate filter 200 may have a thickness of greater than about 4 mils (101.6 microns). For example, in some embodiments, the thickness of the channel walls 206 may be in a range from about 4 mils up to about 30 mils (762 microns). In some other embodiments, the thickness of the channel walls 206 may be in a range from about 7 mils (177.8 microns) to about 20 mils (508 microns).

In some embodiments of the particulate filter 200 described herein the channel walls 206 of the particulate filter 200 may have a bare open porosity (i.e., the porosity before any coating is applied to the plugged honeycomb body) % P≥35% prior to the application of any coating to the particulate filter 200. In some embodiments the bare open porosity of the channel walls 206 may be such that 40%≤% P≤75%. In other embodiments, the bare open porosity of the channel walls 206 may be such that 45%≤% P≤75%, 50%≤% P≤75%, 55%≤% P≤75%, 60%≤% P≤75%, 45%≤% P≤70%, 50%≤% P≤70%, 55%≤% P≤70%, or 60%≤% P≤70%.

Further, in some embodiments, the channel walls 206 of the particulate filter 200 are formed such that the pore distribution in the channel walls 206 has a median pore size of ≤30 microns prior to the application of any coatings (i.e., bare). For example, in some embodiments, the median pore size may be ≥8 microns and less than or ≤30 microns. In other embodiments, the median pore size may be ≥10 microns and less than or ≤30 microns. In other embodiments, the median pore size may be ≥10 microns and less than or ≤25 microns. In some embodiments, particulate filters produced with a median pore size greater than about 30 microns have reduced filtration efficiency while with particulate filters produced with a median pore size less than about 8 microns may be difficult to infiltrate the pores with a washcoat containing a catalyst. Accordingly, in some embodiments, it is desirable to maintain the median pore size of the channel wall in a range of from about 8 microns to about 30 microns, for example, in a range of rom 10 microns to about 20 microns.

In one or more embodiments described herein, the plugged honeycomb body of the particulate filter 200 is formed from a metal or ceramic material such as, for example, cordierite, silicon carbide, aluminum oxide, aluminum titanate or any other ceramic material suitable for use in elevated temperature particulate filtration applications. For example, the particulate filter 200 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the plugged honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body can then be plugged in a predefined plugging pattern with a ceramic plugging composition and the honeycomb body is dried and/or heated to secure the plugs in the channels.

Figure 4:
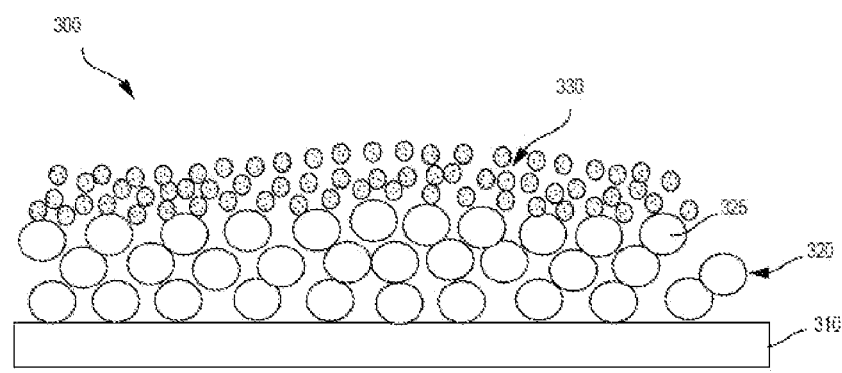
FIG. 4 schematically depicts a wall of a honeycomb body with particulate loading.

In various embodiments the plugged honeycomb body is configured to filter particulate matter from a gas stream, for example, an exhaust gas stream from a gasoline engine. Accordingly, the median pore size, porosity, geometry and other design aspects of both the bulk and the surface of the plugged honeycomb body are selected taking into account these filtration requirements of the plugged honeycomb body. As an example, and as shown in the embodiment of FIG. 4, a wall 310 of the plugged honeycomb body 300, which can be in the form of the particulate filter as shown in FIGS. 2 and 3, has filtration material deposits 320 disposed thereon, which in some embodiments is sintered or otherwise bonded by heat treatment. The filtration material deposits 320 comprise particles 325 that are deposited on the wall 310 of the plugged honeycomb body 300 and help prevent particulate matter from exiting the plugged honeycomb body along with the gas stream 330, such as, for example, soot and/or ash, and to help prevent the particulate matter from clogging the base portion of the walls 310 of the plugged honeycomb body 300. In this way, and according to embodiments, the filtration material deposits 320 can serve as the primary filtration component while the base portion of the plugged honeycomb body can be configured to otherwise minimize pressure drop for example as compared to honeycomb bodies without such filtration material deposits. The filtration material deposits are delivered by the apparatus and deposition methods disclosed herein.

The material, which in some portions or some embodiments may be an inorganic layer, on walls of the plugged honeycomb body is very thin compared to thickness of the base portion of the walls of the plugged honeycomb body. The material, which may be an inorganic layer, on the plugged honeycomb body can be formed by methods that permit the deposited material to be applied to surfaces of walls of the plugged honeycomb body in very thin applications or in some portions, layers. In embodiments, the average thickness of the material, which may be deposit regions or an inorganic layer, on the base portion of the walls of the plugged honeycomb body is greater than or equal to 0.5 µm and less than or equal to 50 µm, or greater than or equal to 0.5 µm and less than or equal to 45 µm, greater than or equal to 0.5 µm and less than or equal to 40 µm, or greater than or equal to 0.5 µm and less than or equal to 35 µm, or greater than or equal to 0.5 µm and less than or equal to 30 µm, greater than or equal to 0.5 µm and less than or equal to 25 µm, or greater than or equal to 0.5 µm and less than or equal to 20 µm, or greater than or equal to 0.5 µm and less than or equal to 15 µm, greater than or equal to 0.5 µm and less than or equal to 10 µm. In one or more embodiments, the inorganic material comprises alumina.

Figure 5:
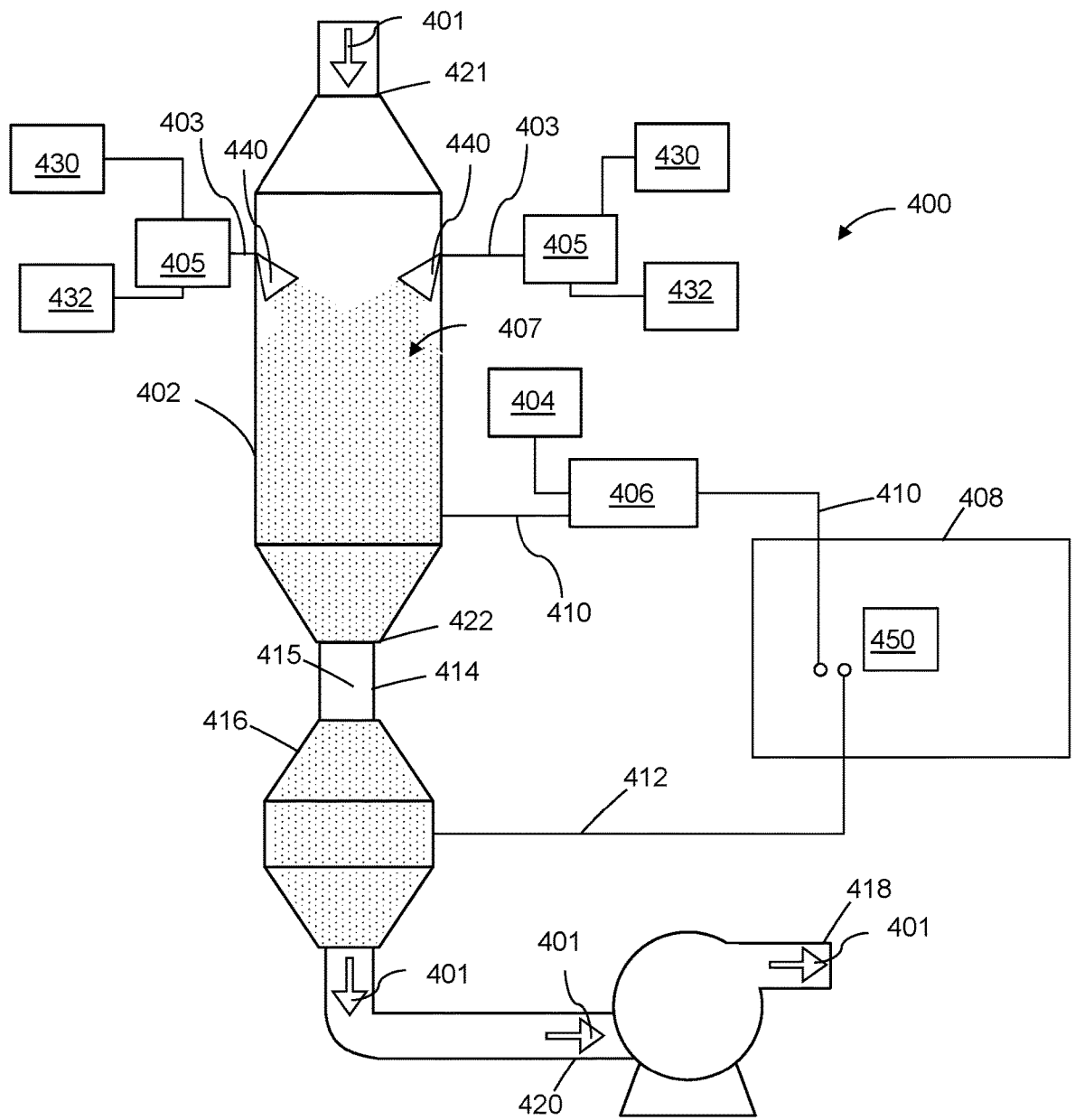
FIG. 5 schematically depicts an apparatus configured to deposit inorganic particles on a honeycomb substrate according to an embodiment of the disclosure.

Referring now to FIG. 5, an embodiment of an apparatus 400 configured to apply inorganic particles 407 to a plugged honeycomb body is shown. In one or more embodiments, the plugged honeycomb body is the type shown in FIGS. 2 and 3, and the plugged honeycomb body comprises porous walls, an inlet end and an outlet end. The apparatus 400 shown in FIG. 5 comprises a duct 402 spanning from a first end 421 to a second end 422. The apparatus further comprises a deposition zone 414 configured to house a plugged honeycomb body 415 in fluid communication with the second end 422 of the duct 402. In the embodiment shown, the apparatus further comprises at least one inlet 403 in fluid communication with the duct 402, the inlet 403 upstream from the deposition zone 414. In FIG. 5, the arrows 401 depict a direction of flow through the apparatus 400, in particular the duct 402, the deposition zone 414 and the plugged honeycomb body 415. The term "upstream" refers to a position or location in the apparatus that encounters flow before another position or location in the apparatus. Likewise, "downstream" refers to a position or location in the apparatus that encounters flow after another position or location in the apparatus. Thus, the first end 421 of the duct 402 encounters flow through the apparatus prior to the second end 422 of the duct 402, and the second end 422 of the duct 402 encounters flow through the apparatus prior to the deposition zone 414.

In the embodiment shown in FIG. 5, the apparatus further comprises an inorganic particle source 405 in fluid communication with the inlet 403. The inorganic particle source 405 is configured to deliver the inorganic particles 407 to the inlet 403 and to the deposition zone 414. According to one or more embodiments, "configured to deliver inorganic particles to the inlet and the deposition zone" comprises a particle source that includes a device or a way of introducing the inorganic particles 407 into the duct 402. For example, the inlet 403 can be an opening in the wall of the duct 402 and may include a conduit such as delivery channel, and the inorganic particle source 405 may comprise a container for holding a quantity of the inorganic particles 407. The inorganic particles 407 from the inorganic particle source may be introduced into the inlet 403 by gravity feeding, a screw auger, a conveyor or any other suitable device to introduce the inorganic particles 407 into the duct 402. The apparatus 400 further comprises a flow generator 418 in fluid communication with the duct 402 and the deposition zone 414 and configured to establish a flow of a fluid and the inorganic particles 407 introduced into the duct 402. In one or more embodiments, the fluid is a gas, for example air, nitrogen or a mixture thereof. Non-limiting examples of a flow generator 418 includes a fan, a blower and/or a vacuum pump, which establishes a fluid flow, such as a gas flow in the direction of arrows 401. The flow generator 418 is in fluid communication with an exit chamber 416 downstream from the deposition zone and an exit conduit 540.

The apparatus 400 further comprises a first sampling port 410 upstream from and in fluid communication with the deposition zone 414. According to one or more embodiments, the first sampling port 410 comprises a pipe, tubing or other suitable conduit to divert a portion of the inorganic particles 407 from the duct 402. The apparatus 400 further comprises a second sampling port 412 downstream from and in fluid communication with the deposition zone 414. In one or more embodiments, the second sampling port 412 comprises a pipe, tubing or other suitable conduit to divert a portion of the inorganic particles 407 from the exit chamber 416.

In the apparatus 400 shown in FIG. 5, a particle counter 408 is in fluid communication with the first sampling port and the second sampling port, and the particle counter is configured to count a selected portion of the inorganic particles in a preselected inorganic particle size range. In specific embodiments, the particle counter is configured to count the inorganic particles 407 upstream from the deposition zone and downstream from the deposition zone. As will be understood from FIG. 5, the first sampling port 410 delivers a selected portion of the inorganic particles 407 in the duct 402 to the particle counter 408. According to one or more embodiments, "selected portion" refers to a fraction of the inorganic particles 407, which are then analyzed by the particle counter 408. According to one or more embodiments, "particle" includes agglomerates of individual particles and "particle size distribution" includes a distribution of agglomerates.

In one or more embodiments, "preselected particle size range" refers to a particle size distribution that is narrower that the particle size distribution of the inorganic particles 407 that are flowed through the first sampling port and delivered to the particle counter 408. As a non-limiting example, if the particle size distribution of the inorganic particle 407 in the duct 402 ranges from 0.01 µm to 100 µm, a preselected particle size range is from 0.1 µm to 50 µm, which is a narrower particle size distribution than the particle size distribution of the particle 507 in the duct 402. In one or more embodiments, the preselected particle size range is 0.1 µm to 50 µm, 0.1 µm to 40 µm, 0.1 µm to 30 µm, 0.1 µm to 20 µm, 0.1 µm to 10 µm, 0.1 µm to 5 µm, 0.1 µm to 4 µm, 0.1 µm to 3 µm, 0.1 µm to 2 µm, 0.1 µm to 1 µm, 0.1 µm to 0.5 µm, 0.2 µm to 50 µm, 0.2 µm to 40 µm, 0.2 µm to 30 µm, 0.2 µm to 20 µm, 0.2 µm to 10 µm, 0.2 µm to 5 µm, 0.1 µm to 4 µm, 0.2 µm to 3 µm, 0.2 µm to 2 µm, 0.2 µm to 1 µm, 0.2 µm to 0.5 µm, 0.3 µm to 50 µm, 0.3 µm to 40 µm, 0.3 µm to 30 µm, 0.3 µm to 20 µm, 0.3 µm to 10 µm, 0.3 µm to 5 µm, 0.3 µm to 4 µm, 0.3 µm to 3 µm, 0.3 µm to 2 µm, 0.3 µm to 1 µm, or 0.3 µm to 0.5 µm.

The particle counter 408 according to one or more embodiments comprises any type of particle counter that is capable of counting particles in the ranges provided above. Non-limiting examples of particle counters include an optical spectrometer, for example, a spectrometer such as a Palas® Promo® 2000 available from Palas GmbH (https://www.palas.de/en/), an engine exhaust particle size analyzer particle size spectrometer, a scanning mobility particle sizer or a condensation particle counter.

In some embodiments, upstream sampling In one or more embodiments, the apparatus 400 further comprises an inorganic particle concentration dilution device 406 upstream from the particle counter 408 and downstream from the first sampling port 410, the inorganic particle concentration dilution device 406 configured to reduce a concentration of the inorganic particles at the first sampling port prior to flowing the inorganic particles 407 to the particle counter 408. In the embodiment shown, the inorganic particle concentration dilution device 406 comprises a dilution chamber or container. The apparatus may further comprise a gas supply 404, for example air or nitrogen in fluid communication with the inorganic particle concentration dilution device 406 to reduce the concentration of inorganic particles 407 in the duct 402 to a lower concentration in weight per unit volume (e.g., /cm$^3$ or g/l). In FIG. 5 only an upstream diluing gas supply 404 is illustrated, as any downstream diluting gas supply is not pictured. In one or more embodiments, the dilution chamber is configured to provide a gas to particle ratio in a range of from 20:1 to 100:1 in the dilution chamber or a gas to particle ratio in a range of from 70:1 to 100:1 in the dilution chamber. Other suitable ranges of gas to particle ratio include from 10:1 to 100:1, from 20:1 to 100:1, from 30:1 to 100:1, from 40:1 to 100:1, from 50:1 to 100:1, from 60:1 to 100:1, from 70:1 to 100:1 from 80:1 to 100:1 and from 90:1 to 100:1. In some embodiments, upstream sampling is not diluted. In some embodiments, downstream sampling is not diluted. In some embodiments, upstream sampling is not diluted and downstream sampling is not diluted. In some embodiments, dilution is provided if the particle concentration in the sampling duct is too high relative to the particle counter sensitivity; thus, in some embodiments, there is dilution in both upstream and downstream ports, neither port, or any combination (only upstream, or only downstream)—if the particle concentration is too high in either port.

In some embodiments, the dilution device 406 comprises a flow splitting connection providing a gas to particle ratio in a range of from 20:1 to 100:1 in the dilution chamber. In some embodiments, the dilution device comprises a flow splitting connection providing a gas to particle ratio in a range of from 70:1 to 100:1 in the dilution chamber. Other suitable ranges of gas to particle ratio include from 10:1 to 100:1, from 20:1 to 100:1, from 30:1 to 100:1, from 40:1 to 100:1, from 50:1 to 100:1, from 60:1 to 100:1, from 70:1 to 100:1 from 80:1 to 100:1 and from 90:1 to 100:1. In some specific embodiments, the dilution device 406 comprises a commercially available dilution device such as LDD 100 available from Palas GmbH (https://www.palas.de/en/).

In one or more embodiments, the apparatus 400 further comprises a processor 450 configured to calculate a percentage of inorganic particles trapped by the plugged honeycomb body based according to the formula $(n_u-n_d)/n_u$, wherein $n_u$=number of inorganic particles upstream from the deposition zone and $n_d$=number of particles downstream from the deposition zone. In one or more embodiments, the processor 450 may be integral with the particle counter 408 or separate from the particle counter 408. In some embodiments the processor comprises includes a central processing unit (CPU), a memory, and support circuits. The processor 450 may be one of any form of general-purpose computer processor that can be used in an industrial setting for counting particles and performing calculations on different size ranges of particles. The memory, or computer readable medium of the processor 450 may be one or more of readily available memory such as random access memory (RAM), read only memory (ROM), floppy disk, hard disk, optical storage media (e.g., compact disc or digital video disc), flash drive, or any other form of digital storage, local or remote. The support circuits are coupled to the CPU for supporting the processor 450 in a conventional manner. These circuits include cache, power supplies, clock circuits, input/output circuitry and subsystems, and the like. One or more processes may be stored in the memory as software routine that may be executed or invoked to control the operation of the particle counter 408 in the manner described herein.

In one or more embodiments, the inorganic particle source 405 is in fluid communication with an atomizing nozzle 440. In one or more embodiments including an atomizing nozzle 440, the fluid is a gas, and the atomizing nozzle is in fluid communication with a liquid source 430 and a binder 432, and the binder 432, the liquid source 430 and the inorganic particle source 405 are configured to be flowed through the atomizing nozzle 440 to form an aerosol. It will be appreciated that the apparatus 400 can be configured in a variety of ways. For example, while two separate inlets 103 and atomizing nozzles 440 are shown, there can be any number of inlets 103 and atomizing nozzles. For example, there can be one, two, three, four, five or more each of the atomizing nozzle 440 and inlet 430. While the liquid source 430 and binder source 432 are shown as being separate in FIG. 1, it will be understood that the inorganic particles can be mixed in the inorganic particle source 405 with a binder and a liquid (for example, water, or an alcohol such as ethanol).

Another aspect of the disclosure pertains to a method of applying inorganic particles to a plugged honeycomb body comprising porous walls, an inlet end and an outlet end. The method comprises flowing the inorganic particles through a from a first end of a duct to a second end of the duct to a plugged honeycomb body in fluid communication with the second end of the duct, sampling a portion of the inorganic particles from sampling port upstream from and in fluid communication with the plugged honeycomb body and from a second sampling port downstream from and in fluid communication with the plugged honeycomb body, and counting a selected portion of the inorganic particles from the first sampling port and the second sampling port, the selected portion of the inorganic particles in a preselected inorganic particle size range. The method can be performed in any suitable apparatus, such as the apparatus 400 shown in FIG. 1. In some embodiments, the counting is performed with a particle counter. In some embodiments, a flow generator in fluid communication with the duct and the plugged honeycomb body is used to generate a flow of inorganic particles configured to establish a flow of a fluid and the inorganic particles. The flow generator can be any of the types of flow generators described above. The preselected inorganic particle size range in one or more embodiments is in the ranges provided above. In one or more embodiments, the particle counter can be any of the particle counters described above.

In some embodiments, the method comprises diluting the flow of particles upstream from the particle counter and downstream from the first sampling port to reduce a concentration of inorganic particles at the first sampling port prior to flowing to the particle counter. The concentration of inorganic particles can be reduced in any of the dilution devices 406 described above and in any of the dilution ranges described above, for example from 20:10 to 100:1 or 70:1 to 100:1. In some embodiments, upstream sampling is not diluted. In some embodiments, downstream sampling is not diluted. In some embodiments, upstream sampling is not diluted and downstream sampling is not diluted. In some embodiments, dilution is provided if the particle concentration in the sampling duct is too high relative to the particle counter sensitivity; thus, in some embodiments, there is dilution in both upstream and downstream ports, neither port, or any combination (only upstream, or only downstream)—if the particle concentration is too high in either port.

In some embodiments, the method further comprises calculating a percentage of inorganic particles trapped by the plugged honeycomb body based according to the formula $(n_u-n_d)/n_u$, wherein $n_u$=number of inorganic particles upstream from the deposition zone and $n_d$=number of particles downstream from the deposition zone. This calculation can be performed by a processor as described with respect to the apparatus.

In one or more embodiments, the inorganic particles are flowed through an atomizing nozzle. In one or more embodiments, the fluid of the method is a gas, and the inorganic particles and a liquid and a binder are flowed through the atomizing nozzle to form an aerosol.

Known measurement systems to measure the filtration efficiency of a plugged honeycomb body such as a GPF, create particulates in the range of 10 nm to 0.5 um by generating soot via a burner rig and pushing the generated particulates through the unplugged body with a blower. Sampling ports before and after the part equipped with particle counting instruments (SMPS, EEPS, etc.) record particle concentrations at specific particle diameters. In general, air filtration efficiency can be calculated as $$\mu_e = n_t/n_u = (n_u-n_d)/n_u \qquad (1)$$

where, $\mu_e$=air filter efficiency, $n_t$=particles trapped, $n_u$=particles upstream, and $n_d$=particles downstream.

Figure 6A:
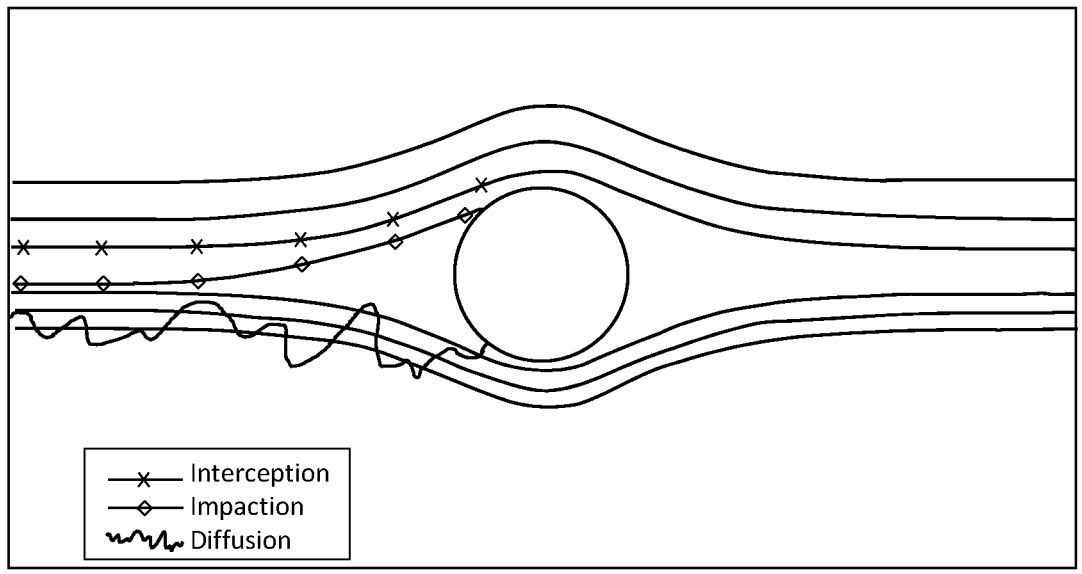
FIGS. 6A and 6B are schematics depicting trapping mechanisms of particulate filters as function of particle size.
Figure 6B:
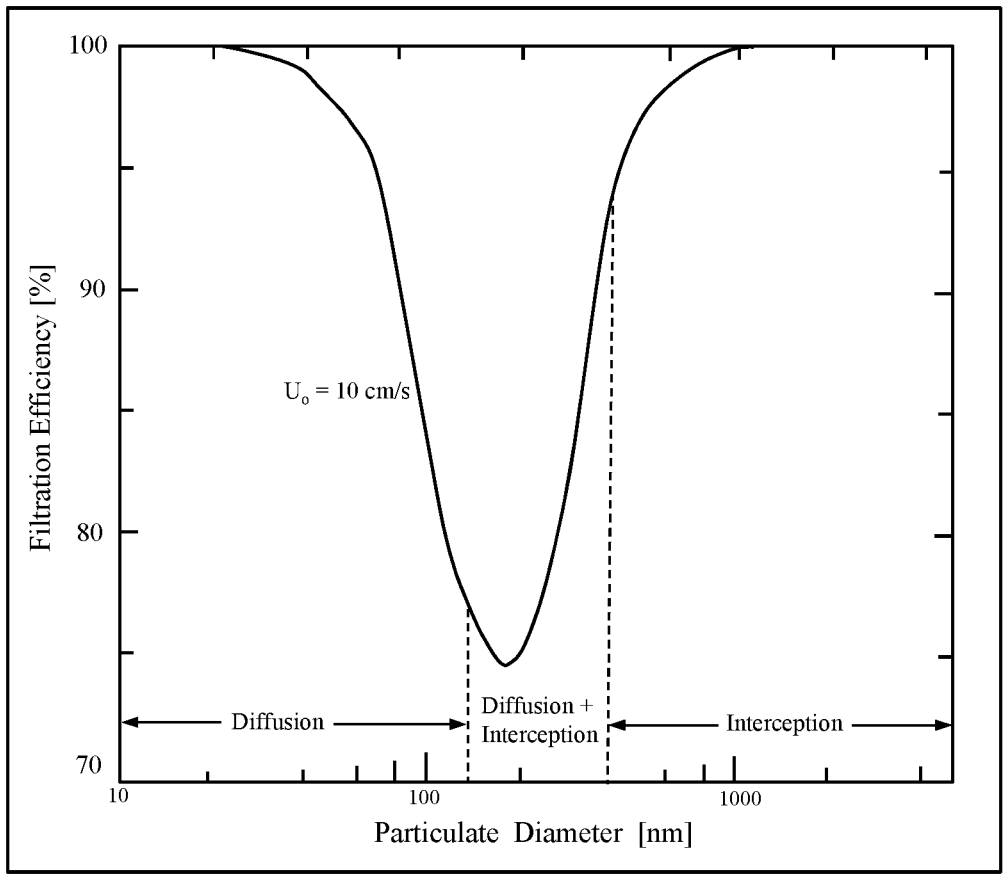

While the claims of the present disclosure should not be limited by a particular theory of operation, for porous filters such as GPFs, as shown in FIGS. 6A and 6B, in various embodiments of interest three particulate trapping mechanisms appear to combine to effect filtration and therefor affect filtration efficiency: interception, impaction, and diffusion (depending on the particle size). The smaller particles are trapped by diffusion, the larger particles are trapped by interception and impaction. Consequently, the initial filtration efficiency of a new GPF can vary for different particle sizes being delivered to the filter body. Thus smaller and larger particles are trapped by the filter body, and lower filtration efficiency is observed for particles of around 200 nm in diameter.

According to one or more embodiments, GPF filters can be modified with a surface treatment by depositing small inorganic particles or agglomerates of inorganic particles (e.g., alumina powder), in some embodiments along with a binder (e.g., an organic binder, or an inorganic binder) onto and/or into the walls channels of a GPF filter. As the agglomerates are deposited onto the inlet channels of the filter they can act to modify the pores in the microstructure of the channel walls. During the build-up of the agglomerates the filtration efficiency of the filter increases from a base (non-deposited) value (such as 50%) to a target value desired for the application, such as greater than 90%.

According to one or more embodiments, the apparatus described with respect to FIG. 5 and the methods described herein can include spray-drying inorganic particles such as alumina particles and binder in an ethanol or water suspension using at least one nozzle acting at high pressure. Once the suspension containing the inorganic particles is sprayed out of the nozzle into a heated chamber to form an aerosol, the particles or agglomerates dry such as with a particle size distribution ranging from about 0.01 µm to about 50 µm. The dry particles and/or agglomerates are then carried through a duct and deposited into and/or onto the porous walls of a plugged honeycomb body.

Specific embodiments of a process that can be performed in the apparatus shown in FIG. 5 will now be described. It will be appreciated that, while the specific embodiments described pertain to forming an aerosol from a suspension comprising inorganic particles, solvent and a binder, the disclosure is not limited to such processes. For example, dry aerosol processes could be utilized. In other embodiments, inorganic particles can be fed directly into the inlet 430 of the apparatus 400 of FIG. 5. In other embodiments, inorganic particles without binder is introduced into the filter body.

Commercially available inorganic particles can be used as a raw material in a mixture in the formation of an inorganic material in the form of inorganic particles for depositing. According to one or more embodiments, the particles are selected from $Al_2O_3$, $SiO_2$, $TiO_2$, $CeO_2$, $ZrO_2$, SiC, MgO and combinations thereof. In one or more embodiments, the mixture is a suspension. The particles may be supplied as a raw material suspended in a liquid vehicle to which a further liquid vehicle is optionally added.

In some embodiments, the liquid vehicle is an alcohol (e.g. ethanol). In other embodiments, the liquid is water. In some embodiments, both water and an alcohol constitute the liquid vehicle. Thus in some embodiments the mixture is aqueous-based; for example, a liquid vehicle of the suspension may be water. In other embodiments, the mixture is organic-based; for example, a liquid vehicle of the mixture may be an alcohol, such as ethanol or methanol or combinations thereof. In one or more embodiments, the liquid vehicle has a vapor pressure that is greater than the vapor pressure of water at the temperature of the gaseous carrier stream. In one or more embodiments, the liquid vehicle consists essentially of a material having a boiling point below the boiling point of water at the temperature of the gaseous carrier stream. In one or more embodiments, the liquid vehicle is an alcohol. In one or more embodiments, the liquid vehicle is methoxyethanol, ethanol, xylene, methanol, ethylacetate, benzene, or mixtures thereof. In one or more embodiments, the liquid vehicle is alcohol. In one or more embodiments, the liquid vehicle consists essentially of water.

In some embodiments, the suspension comprises by weight: 5-20% particles and 80-95% liquid, and all values and subranges therebetween. In an embodiment, the suspension comprises by weight: 11 percent±1% alumina and 89 percent±1% ethanol.

In one or more embodiments, the particles have a median primary particle size in a range of from about 10 nm to 4 about microns, about 20 nm to about 3 microns or from about 50 nm to about 2 microns, or from about 50 nm to about 900 nm or from about 50 nm to about 600 nm. In specific embodiments, the median primary particle size is in a range of from about 100 nm to about 200 nm, for example, 150 nm. The median primary particle size can be determined as a calculated value from the BET surface area of the aerosol particles, which in some embodiments is 10 $m^2/g$ currently.

In one or more embodiments, the primary particles comprise a ceramic particle, such as an oxide particle, for example $Al_2O_3$, $SiO_2$, MgO, $CeO_2$, $ZrO_2$, CaO, $TiO_2$, cordierite, mullite, SiC, aluminum titanate, and mixture thereof.

The mixture is formed using a solvent which is added to dilute the suspension if needed. Decreasing the solids content in the mixture could reduce the aggregate size proportionally if the droplet generated by atomizing has similar size. The solvent should be miscible with suspension mentioned above, and be a solvent for binder and other ingredients.

Binder is optionally added to reinforce the agglomerates and to preferably provide a stickiness or tackiness, and can comprise inorganic binder, to provide mechanical integrity to deposited material. The binder can provide binding strength between particles at elevated temperature (>500° C.). The starting material can be organic. After exposure to high temperature in excess of about 150° C., the organic starting material will decompose or react with moisture and oxygen in the air, and the final deposited material composition could comprise $Al_2O_3$, $SiO_2$, MgO, $CeO_2$, $ZrO_2$, CaO, $TiO_2$, cordierite, mullite, SiC, aluminum titanate, and mixture thereof.

Catalyst can be added to accelerate the cure reaction of binder. An exemplary catalyst content is 1% by weight of the binder.

Stirring of the mixture or suspension during storage and/or awaiting delivery to the nozzle may be conducted by using desired stirring techniques. In one or more embodiments, stirring is conducted by a mechanical stirrer. In an embodiment, the use of a mechanical stirrer facilitates reduction and/or elimination of potential contaminations from plastic-coated mixing rods, which are in contact with a holding vessel, used in magnetic stirring systems.

In some embodiments, the mixture is atomized into fine droplets by high pressure gas through a nozzle. One example of the nozzle is 1/4J-SS+SU11-SS from Spraying Systems Co. This setup is comprised of a nozzle body along with fluid cap 2050 and air cap 67147. The atomizing gas can contribute to breaking up the liquid-particulate-binder stream into the droplets.

In one or more embodiments, the nozzle herein is a nozzle that utilizes internal mixing, for example, internal mixing nozzles the part numbers are given above. In one or more embodiments, the nozzle herein is a nozzle that utilizes external mixing, for example, Spraying Systems external mix nozzle setup: 1/4J-SS+SU1A which is made up of a 64 aircap and a 1650 fluid cap. Another useful setup consists of a 64 aircap and a 1250 fluid cap. External mix nozzles can be advantageous to allow for smaller particle sizes with tighter particle size distribution which improves material utilization and filtration efficiency. In one or more embodiments, the nozzles herein are converging nozzles. As used herein, converging nozzles refer to nozzles having fluid flow passages whose cross-sectional areas decrease from inlet to outlet thereby accelerating flow of the fluids. Converging nozzles may be internally mixed or externally mixed.

In one or more embodiments, the liquid-particulate-binder droplets are directed into the chamber by a nozzle.

In one or more embodiments, the liquid-particulate-binder droplets are directed into the chamber by a plurality of nozzles. In one or more embodiments, atomizing the plurality of liquid-particulate-binder streams occurs with a plurality of atomizing nozzles. The plurality of nozzles may include 2 or more nozzles, 3 or more, 4 or more, 5 or more, 6 or more, 7 or more, 8 or more, 9 or more, 10 or more, and the like. The plurality of nozzles may be evenly spaced within the chamber. In one or more embodiments, each of the plurality of nozzles is angled toward a center of the apparatus. The angle of the nozzles may be acute, ranging from less than 90° to greater than 10° relative to a side wall of the apparatus, and all values and subranges therebetween, including 20° to 45°.

The pressure of the atomizing gas may be in the range of 20 psi to 150 psi. The pressure of the liquid may be in the range of 1 to 100 psi. The average droplet size according to one or more embodiments may be in the range of from 1 micron to 40 microns, including for example, in a range of greater than or equal to 1 micron to less than or equal to 15 microns; greater than or equal to 2 microns to less than or equal to 8 microns; greater than or equal to 4 microns to less than or equal to 8 microns; and greater than or equal to 4 microns to less than or equal to 6 microns; and all values and subranges therebetween. The droplet size can be adjusted by adjusting the surface tension of the mixture, viscosity of the mixture, density of the mixture, gas flow rate, gas pressure, liquid flow rate, liquid pressure, and nozzle design. In one or more embodiments, the atomizing gas comprises nitrogen. In one or more embodiments, the atomizing gas may consist essentially of an inert gas. In one or more embodiments, the atomizing gas may is predominantly one or more inert gases. In one or more embodiments, the atomizing gas may is predominantly nitrogen gas. In one or more embodiments, the atomizing gas may be predominantly air. In one or more embodiments, the atomizing gas may consist essentially of nitrogen or air. In one or more embodiments, the atomizing gas may be dry. In one or more embodiments, the atomizing gas may comprise essentially no liquid vehicle upon entry to the chamber.

In some embodiments, the suspension flow rate is in the range of 10 to 25 g/minute, including all values and subranges therebetween, including 18 g/min.

In some embodiments, the atomizing gas flow rate nitrogen flow rate is in the range of 2 to 10 $Nm^3/hr$, including all values and subranges therebetween, including 5-6 $Nm^3/hr$.

Suspension flow and corresponding agglomerate size may be controlled by a pressure control system or a flow control system, as appropriate to the apparatus. For a pressure control system, a pressure controller is in communication with a delivery conduit such as tubing or piping and a suspension of primary particles in a liquid is introduced into the delivery conduit, which is then flowed to the nozzle. For a flow control system, an injector pump is provided, which delivers the suspension of primary particles in a liquid to the nozzle. Atomizing gas is typically separately supplied to the nozzle. In a preferred embodiment, a pump directs the liquid-particulate-binder mixture to the atomizing nozzle at a substantially constant flow rate. A constant flow rate can be advantageous as opposed to maintaining a constant pressure because the constant flow rate can help reduce variability in the particle sizes which, in turn, improves material utilization.

In one or more embodiments, the suspension comprises an inorganic material, a liquid vehicle, and preferably a binder, which is supplied to the nozzle as a liquid-particulate-binder stream. That is, particles of an inorganic material can be mixed with a liquid vehicle and a binder material to form a liquid-particulate-binder stream. The liquid-particulate-binder stream is atomized with the atomizing gas into liquid-particulate-binder droplets by the nozzle. In one or more embodiments, the liquid-particulate-binder stream is mixed with the atomizing gas. In one or more embodiments, the liquid-particulate-binder stream is directed into the atomizing nozzle thereby atomizing the particles into liquid-particulate-binder droplets. The liquid-particulate-binder droplets are comprised of the liquid vehicle, the binder material, and the particles.

In one or more embodiments, the liquid-particulate-binder stream mixes with the atomizing gas via the atomizing nozzle. In one or more embodiments, the liquid-particulate-binder stream enters the atomizing nozzle. In one or more embodiments, the mixing of the liquid-particulate-binder stream with the atomizing gas occurs inside the atomizing nozzle. In one or more embodiments, the mixing of the liquid-particulate-binder stream with the atomizing gas occurs outside the atomizing nozzle.

According to one or more embodiments, a direct measurement of the inline filtration efficiency of the filter is performed during the deposition process. To accomplish this, in some embodiments, the inorganic particle (which includes agglomerates) concentrations upstream and downstream of the GPF are measured directly during the deposition process and be used to calculate the real-time filter FE using equation 1. In one or more embodiments, the inorganic particle size distribution is similar to the soot particles used in standard offline FE measurements, it is possible to use the inorganic particles sampled from the apparatus 400 in this manner. Using embodiments of the method and apparatus described herein, a controller deposition process can be stopped once the FE target has been reached. This technique would provide a closed-loop control of the inorganic particle deposition process, thereby ensuring there are minimal select losses.

Figure 7:
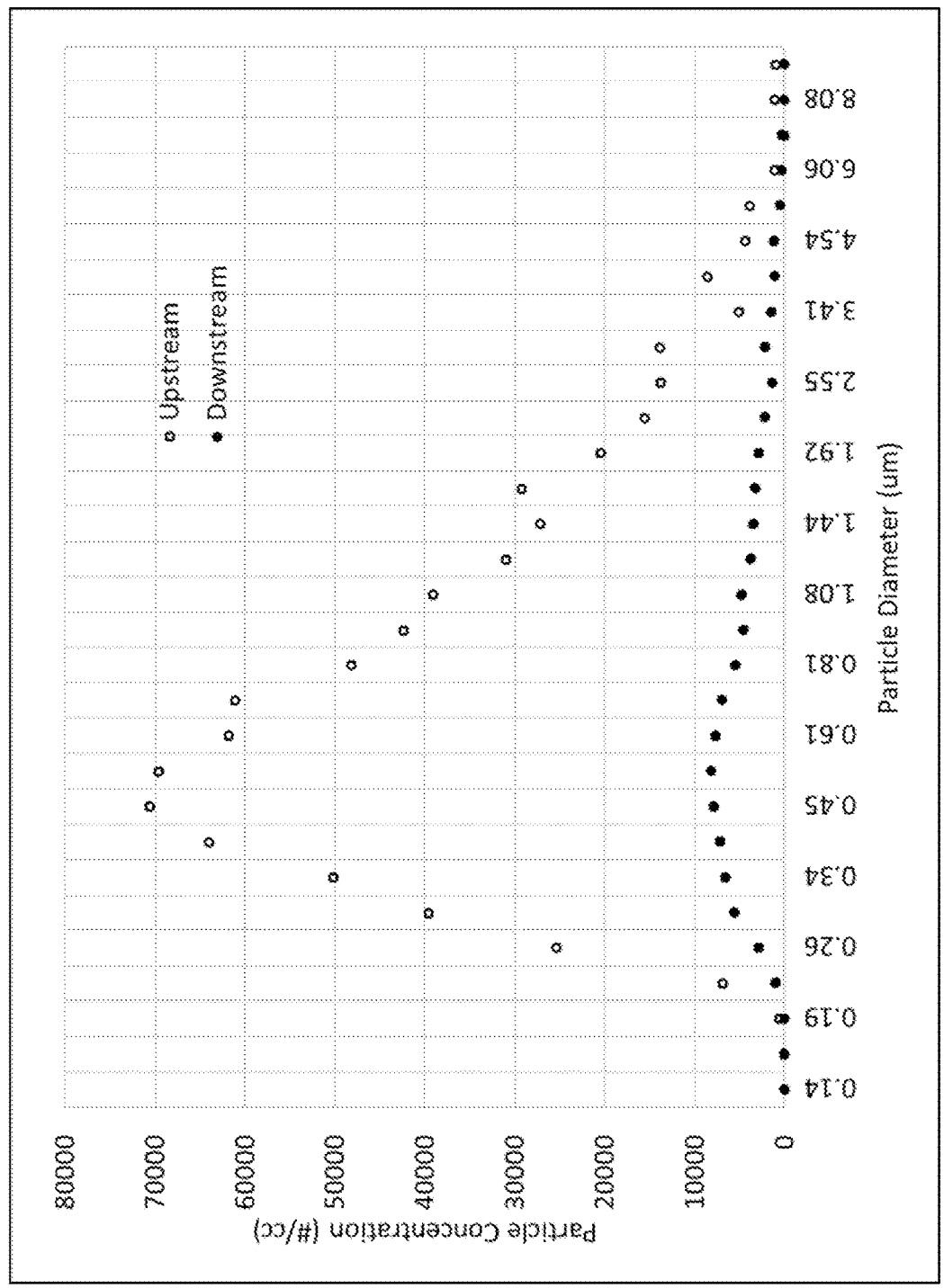
FIG. 7 is a graph showing a representative particle size distribution of agglomerates formed by an aerosol process upstream and downstream of a plugged honeycomb body according to one or more embodiments.

FIG. 7 shows a representative particle size distribution (PSD) of agglomerates upstream and downstream of a plugged honeycomb body placed in a deposition zone of an apparatus shown in FIG. 5 during a trial process. The particle size distribution of the inorganic particle agglomerates were generated by spray-drying nozzles upstream of the plugged honeycomb body. FE measurements can advantageously be made on GPF filters in the 0.3-0.5 μm particle size range. As can be seen in FIG. 7 there were a substantial number of particles generated by the process within this size range. Also shown in FIG. 7 is the particle size distribution downstream of the plugged honeycomb body during the deposition process. As seen in FIG. 7 from the reduced number of particles available in the 0.3-0.5 µm range after the part that the plugged honeycomb body has filtered out many of these particles as they deposit on and/or in the inner walls of the GPF cells.

Figure 8:
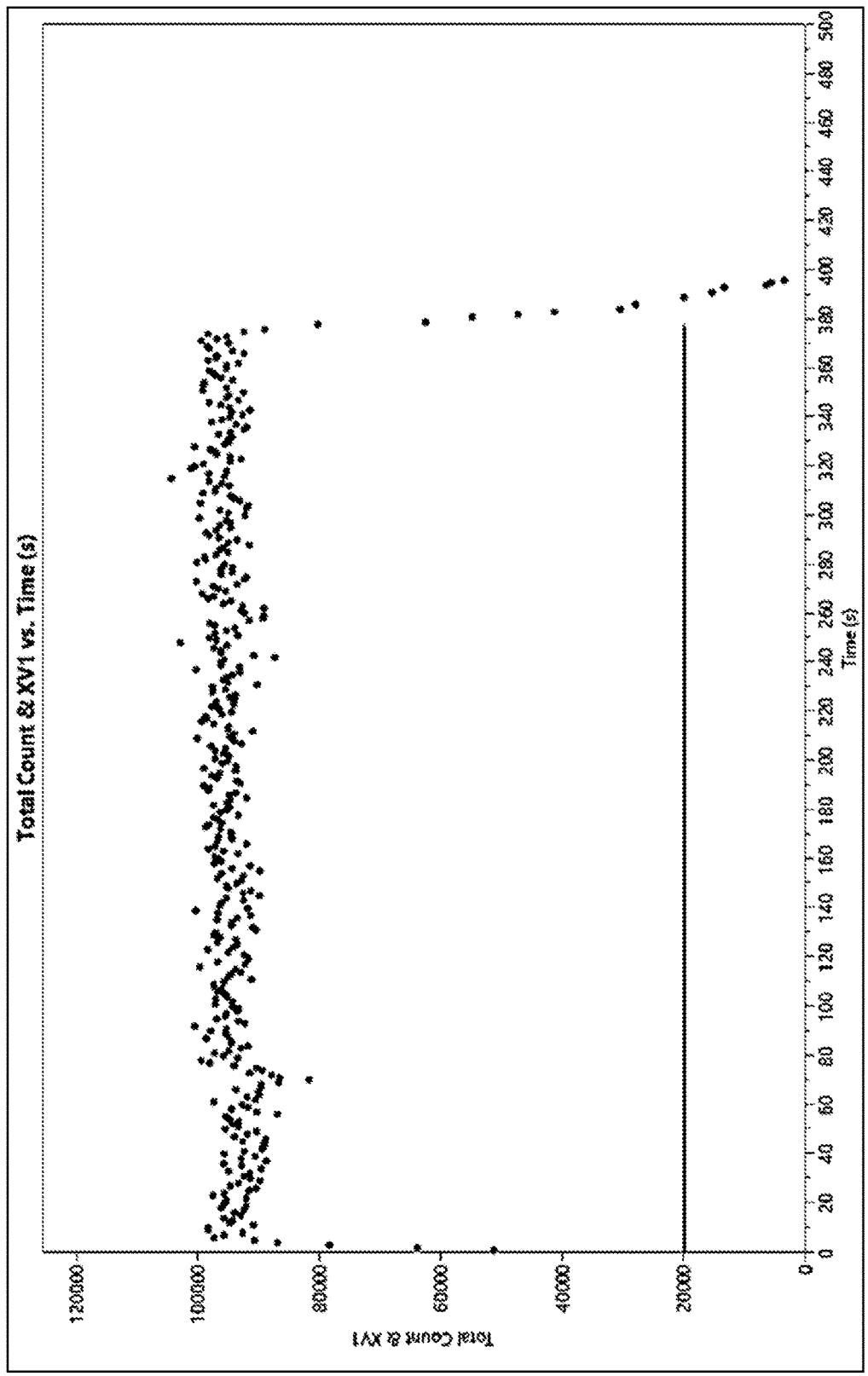
FIG. 8 is a graph showing a particle concentration of an aerosol process upstream of a plugged honeycomb body during deposition.
Figure 9:
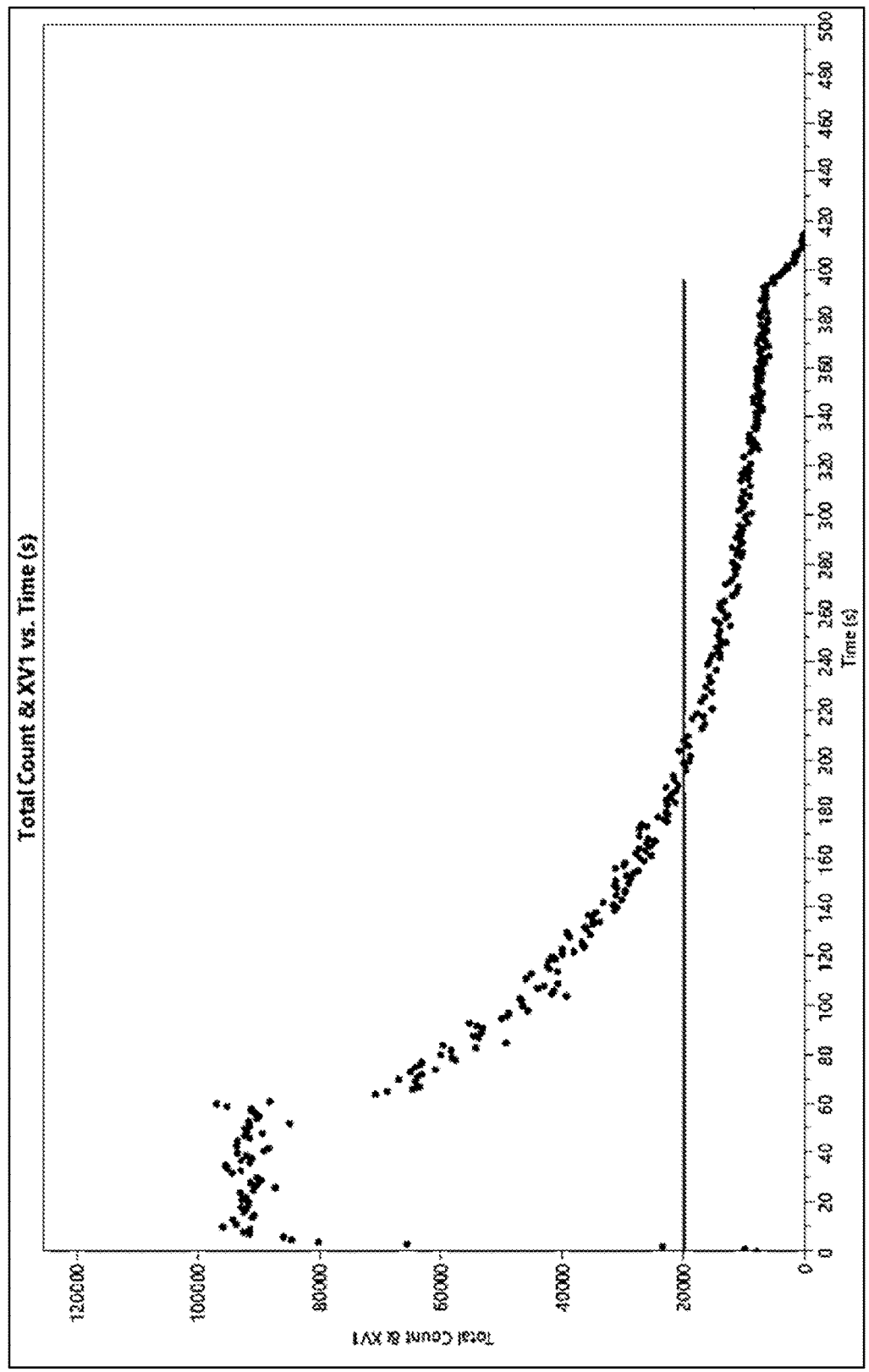
Figure 10:
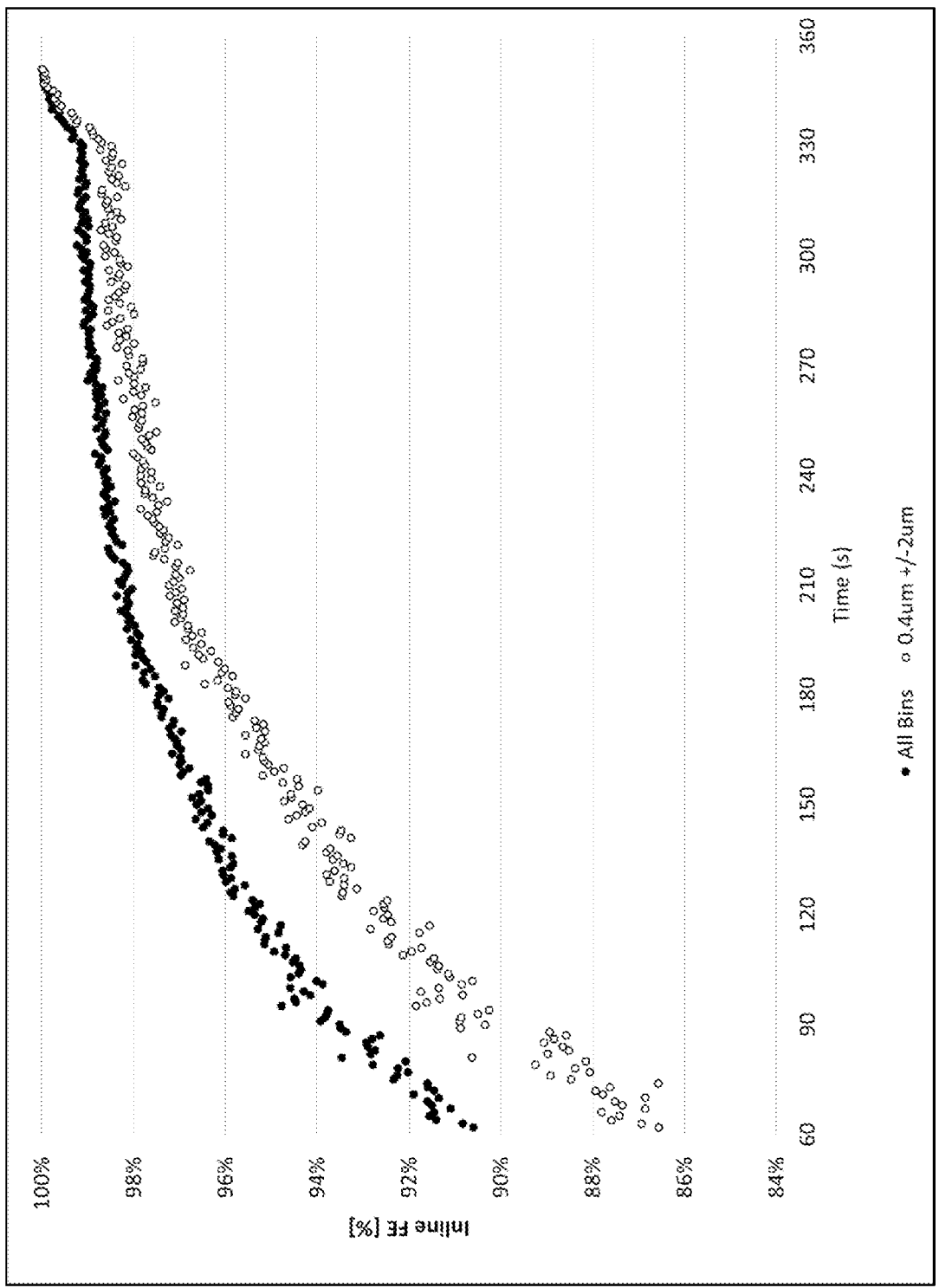
Figure 11:
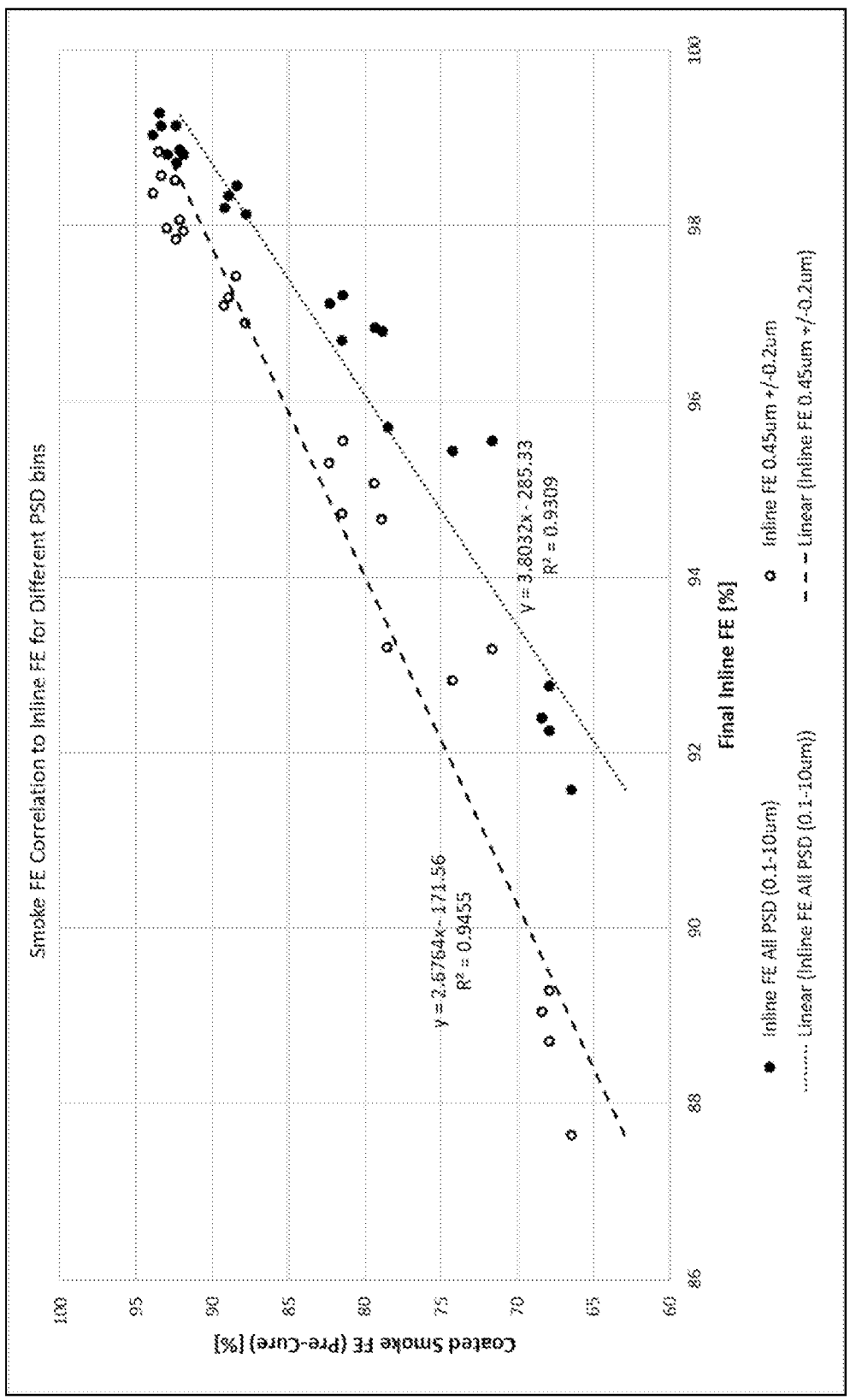

Using equation 1 and the measure of the total particle concentration upstream and downstream of the plugged honeycomb body during the deposition process, it is possible to calculate the FE of the part during the run. FIG. 8 shows the measured stability of the total particle count in the duct 402 upstream of the plugged honeycomb body. In FIG. 8, the total particle concentration is measured during the entire time the inorganic particles are deposited on the plugged honeycomb body. The stability of the measurement is acceptable for the inline FE measurement. The data in FIG. 8 was measured by an optical spectrometer sampling the particulates upstream of the part. The particle size range which was included in the total particle concentration was from 0.1 µm-10 µm. As this plot shows, the inorganic particles agglomerate particle concentration remains stable during the ~380 seconds of the deposition process. The circles represent the particle concentration and the line represents the time over which the nozzle is flowing liquid and spray-drying the suspension of binder, ethanol and inorganic particles.

FIG. 9 shows the same total particle count measurement upstream and downstream during the coating of a single plugged honeycomb body in the deposition process. The upstream concentration (with dilution) is measured for the first 60 seconds and then the aerosol spectrometer is switched to monitor the downstream particle concentration (see FIG. 5). The inline FE process can use a single particle counter with a valve to switch between upstream and downstream concentration or two separate particle counters dedicated to upstream and downstream sampling. When using a single particle counter it is assumed the upstream particle concentration is stable during the entire deposition time even after the counter switches to the downstream port.

FIG. 9 shows the process particle concentration upstream (0-60 sec.) and downstream (60-420 sec.) of the plugged honeycomb body during particle deposition. The data was obtained from an optical spectrometer sampling the deposition process particulates after the part, that is, downstream from the deposition zone in FIG. 5. The particle size range which was included in the total particle concentration was from 0.1 μm-10 μm. As the plugged honeycomb body is deposited with particulate material, the particle concentration downstream of the part decreases. The solid line indicates the time that the spray nozzles are flowing liquid and particulates to generate agglomerates.

With the total particle concentrations measured upstream and downstream of the plugged honeycomb body, it is possible to measure inline FE during the process using equation 1. In FIG. 10, the filled circle curve shows the results of this calculation during the deposition process run using all particle sizes (diameters). The plot starts at the 60 second mark of the deposition process when the particle counter was switched from upstream to downstream. The inline FE value was recorded as the process continued to deposit inorganic particles onto the plugged honeycomb body, thereby increasing the filtration efficiency of the GPF. This was recorded directly by the particle counter. The bare GPF inline FE started at roughly 70% and the inline FE increased continuously as the APT process proceeded. At 60 seconds the FE measure with all PSD bins already increased to 90% on the inline FE scale. By the end of the process (at about 330 seconds) the inline FE increased to about 99%.

In FIG. 10, the real-time FE measurement was made using the measured upstream and downstream particle concentrations and equation 1. During the first 60 seconds the upstream measurement was made and after 60 s the downstream measurement was made. The final FE for each part was calculated using the average of the final 10 seconds of the inline FE curve. Data is shown using total particle counts for all particle size bins in the measurement range (0.1 μm-10 μm) and specific bins (0.3 μm-0.7 μm bins)

Also shown on FIG. 10 is the inline FE measurement result using a select number of PSD bins (ranges of particle sizes) from the aerosol spectrometer rather than all bins. Because the plugged honeycomb body filters different particle sizes at different efficiencies, it is possible to customize the inline FE measurement to choose the bins (ranges of particle sizes) which provide the best correlation to an offline FE measurement system and provide the best stability and repeatability. A regression analysis was performed to determine the best combination of particle sizes that maximized the correlation to offline systems and reduced variability in the measurement.

An experiment was performed where 24 parts were run through the deposition process with 4 parts each at 6 different loading levels. The range of loading was meant to cover a wide range of filtration efficiencies from 65% to 95% FE based on an offline smoke FE measurement system. Using all the PSD bins from the aerosol spectrometer, a final inline FE measurement was calculated for each unplugged honeycomb body and compared that with the measured offline FE system. The results of this are presented in FIG. 7. When all of the particle diameters are included in the inline FE measurement, the correlation between the final inline and smoke FE systems was about 93%. After running the optimization study a better correlation was found by choosing only the peak inorganic particle size (based on total count in the duct 402) of 0.45 um and choosing 2 bins to the right and left of this peak (about +/−0.2 um). By using this optimized range of the PSD the inline FE measurement is able to produce a better correlation to the offline smoke FE system (95% vs 93%); create a wider FE range (87%-99% vs 92%-99%) which improves the resolution of the inline FE measurement; maintain an acceptable repeatability of the measurement. The repeatability (1□)) of the inline FE measurement was about 0.5%.

Also shown in FIG. 11 are the results of the optimization study to determine the best inline FE to smoke FE correlation using different particle size distributions. The correlation between the inline and smoke FE systems can be optimized depending on what particle size range is chosen. In this figure it is shown that the inline FE measurement based on the PSD peak (0.45 μm)+/−2 bins (roughly+/−0.2 μm) gives the best correlation (95%) to the smoke FE off line measurement.

As a high level of particle concentration in the duct 402 of the deposition process was too high for even the highest commercially-available particle counter system, the dilution device described above was used for upstream measurements. The dilution ratio was determined by adding more dilution nitrogen to a mixing valve while monitoring the coincidence level from the particle counter. Also, because of the high concentration contamination of the particle counter optics was a concern so regular cleaning was required.

However, with regular preventative maintenance of the equipment the team was able to run for months at a time without issues.

Thus, in various embodiments, methods and apparatus disclosed herein can help to achieve a targeted filtration efficiency when depositing inorganic particles onto and/or into the porous walls of a plugged honeycomb body.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A method of increasing a filtration efficiency of a porous honeycomb filter comprised of a plugged honeycomb body comprising porous walls, an inlet end and an outlet end, the method comprising:
   flowing an inlet flow of inorganic particles into the inlet end of the plugged honeycomb body;
   counting an inlet number of a selected portion of the inorganic particles entering the plugged honeycomb body;
   counting an exit number of a selected portion of the inorganic particles exiting the plugged honeycomb body in an outlet flow;
   wherein inorganic particles which enter the plugged honeycomb body without exiting the plugged honeycomb body are deposited onto and/or into the porous walls of the honeycomb body, thereby increasing a filtration efficiency of the plugged honeycomb body as deposition continues;
   determining a filtration efficiency of the plugged honeycomb body with the deposited particles based on the inlet number and the outlet number; and
   terminating the flowing of the inlet flow of inorganic particles into the inlet end of the plugged honeycomb body based on the determined filtration efficiency.

2. The method of claim 1 wherein the selected portion for the counting of the inlet number is in a preselected inorganic particle size range.

3. The method of claim 1 wherein the selected portion for the counting of the outlet number is in a preselected inorganic particle size range.

4. The method of claim 1 wherein the preselected inorganic particle size range is the same for the selected portions for the counting of the inlet number and the outlet number.

5. The method of claim 2 wherein the preselected inorganic particle size range is in a range of from 0.1 µm to 10 µm.

6. The method of claim 2 wherein the preselected inorganic particle size range is in a range of from 0.1 µm to 1 µm.

7. The method of claim 2 wherein the preselected inorganic particle size range is in a range of from 0.1 µm to 0.5 µm.

8. The method of claim 2 wherein the preselected inorganic particle size range is in a range of from 0.3 µm to 0.5 µm.

9. The method of claim 1 wherein the counting is performed with a particle counter.

10. The method of claim 9 wherein the particle counter comprises an optical spectrometer.

11. The method of claim 9 wherein the particle counter comprises an engine exhaust particle sizer spectrometer.

12. The method of claim 1 wherein the inlet number is obtained from a diluted portion of the inlet flow which is directed into a particle counter.

13. The method of claim 12 wherein the diluted portion has a gas to particle ratio in a range of 20:1 to 100:1.

14. The method of claim 12 wherein the diluted portion has a gas to particle ratio in a range of 70:1 to 100:1.

15. The method of claim 1 wherein the terminating further comprises terminating the flowing of the inlet flow of inorganic particles into the inlet end of the plugged honeycomb body after the filtration efficiency has reached a target filtration efficiency.

16. The method of claim 1 wherein the terminating further comprises terminating the flowing of the inlet flow of inorganic particles into the inlet end of the plugged honeycomb body after the filtration efficiency has failed to reach a target filtration efficiency within a target deposition time.

17. The method of claim 1 wherein the terminating further comprises terminating the flowing of the inlet flow of inorganic particles into the inlet end of the plugged honeycomb body if the exit number exceeds a maximum exit number.

18. The method of claim 1 wherein the terminating further comprises terminating the flowing of the inlet flow of inorganic particles into the inlet end of the plugged honeycomb body if the exit number exceeds a maximum exit number within a target deposition time.

19. The method of claim 1 wherein the plugged honeycomb body comprises inorganic particles deposited in and/or on the porous walls prior to initiation of the flowing of the inlet flow of inorganic particles into the inlet end of the plugged honeycomb body, wherein the flowing of the inlet flow increases the amount of inorganic particles trapped by the plugged honeycomb body.

20. The method of claim 1 wherein the plugged honeycomb body is free of inorganic particles deposited in and/or on the porous walls prior to initiation of the flowing of the inlet flow of inorganic particles into the inlet end of the plugged honeycomb body, wherein the flowing of the inlet flow introduces the inorganic particles to the plugged honeycomb body.

* * * * *